US008868355B2

(12) United States Patent
Huang et al.

(10) Patent No.: US 8,868,355 B2
(45) Date of Patent: Oct. 21, 2014

(54) PASSIVE WIRELESS ANTENNA SENSOR FOR STRAIN, TEMPERATURE, CRACK AND FATIGUE MEASUREMENT

(75) Inventors: Haiying Huang, Arlington, TX (US); Jung-Chih Chiao, Grand Prairie, TX (US); Ronald L. Carter, Arlington, TX (US); Uday Shankar Tata, Arlington, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 259 days.

(21) Appl. No.: 12/867,801

(22) PCT Filed: Feb. 15, 2009

(86) PCT No.: PCT/US2009/034175
§ 371 (c)(1),
(2), (4) Date: Nov. 1, 2010

(87) PCT Pub. No.: WO2009/103042
PCT Pub. Date: Aug. 20, 2009

(65) Prior Publication Data
US 2011/0040498 A1     Feb. 17, 2011

Related U.S. Application Data

(60) Provisional application No. 61/029,086, filed on Feb. 15, 2008.

(51) Int. Cl.
*G01B 7/16*    (2006.01)
*H01Q 21/06*   (2006.01)
*G01B 15/06*   (2006.01)
*H01Q 1/22*    (2006.01)

(52) U.S. Cl.
CPC ............... *G01B 7/16* (2013.01); *H01Q 21/065* (2013.01); *G01B 15/06* (2013.01); *H01Q 1/2225* (2013.01)
USPC ............................................ 702/34; 702/188

(58) Field of Classification Search
USPC ............................ 702/34, 35, 36, 38, 42, 188
See application file for complete search history.

(56) References Cited

U.S. PATENT DOCUMENTS 3,888,115 A    6/1975  Schwartz
5,276,629 A *  1/1994  Reynolds ...................... 702/71
(Continued)

FOREIGN PATENT DOCUMENTS

EP    1613921      8/2007
WO    2009103042   8/2009

OTHER PUBLICATIONS

Tata et al. "Exploiting a patch antenna for strain measurements", Meas. Sol. Technol., 20:1-7 (Nov. 12, 2008).

(Continued)

*Primary Examiner* — Michael Nghiem
*Assistant Examiner* — Ivan Rabovianski
(74) *Attorney, Agent, or Firm* — Parks IP Law LLC; Collen A. Beard

(57) ABSTRACT

An apparatus and method is provided for monitoring a condition of a structure using a passive wireless antenna sensor having a known resonant frequency when mounted on the structure. A series of radio frequency signals are transmitted with sweeping frequencies around the known resonant frequency to the passive wireless antenna sensor. The passive wireless antenna sensor includes a dielectric substrate disposed between an antenna pattern and a ground plane such that a change in the condition of the structure will cause a change in one or more characteristics of the passive wireless sensor. A signal is received from the passive wireless antenna sensor and a resonant frequency of the passive wireless antenna sensor is determined based on the received signal. The determined resonant frequency is then compared to the known resonant frequency, whereby a change in the resonant frequency indicates a change in the condition of the structure.

25 Claims, 9 Drawing Sheets

(56) References Cited

U.S. PATENT DOCUMENTS

| | | | |
|---|---|---|---|
| 5,970,393 A * | 10/1999 | Khorrami et al. | 455/129 |
| 6,910,384 B2 | 6/2005 | Tomka et al. | |
| 7,006,044 B2 | 2/2006 | Choi et al. | |
| 7,444,878 B1 * | 11/2008 | Pepples | 73/722 |
| 7,567,879 B2 * | 7/2009 | Lewis et al. | 702/85 |
| 2005/0223812 A1 * | 10/2005 | Denis | 73/799 |
| 2005/0241403 A1 * | 11/2005 | Thomson et al. | 73/773 |
| 2007/0151356 A1 | 7/2007 | Sumigawa et al. | |
| 2007/0186668 A1 | 8/2007 | Garverick et al. | |
| 2007/0276294 A1 | 11/2007 | Gupta et al. | |

OTHER PUBLICATIONS

Deshmukh et al. "Crack Detection and Monitoring Using Passive Wireless Sensor", ASME Conference (2009).

Tata et al. "Bio-inspired sensor skins for structural health monitoring", Smart Mater. Struct., 18:10 (2009).

Mohammad et al. "Monitoring fatigue crack growth and opening using antenna sensors", Smart Mater. Struct., 19:1-8 (2009).

Deshmukh et al. "Antenna sensor skin for fatigue crack detection and monitoring", Smart Struct. Systs., 8(1):93-105 (2011).

* cited by examiner

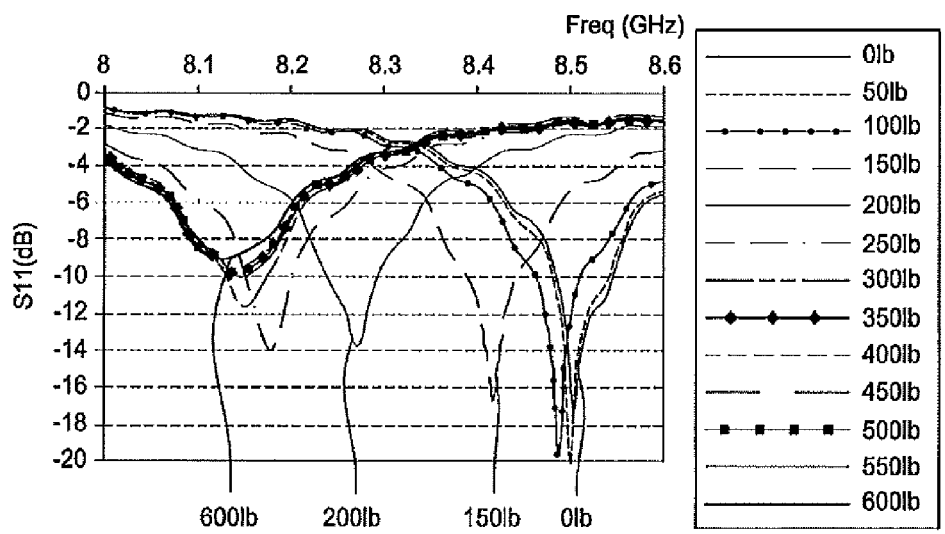
FIG. 16
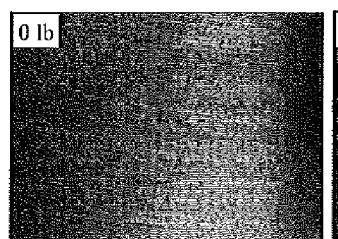 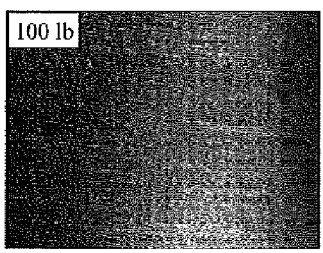 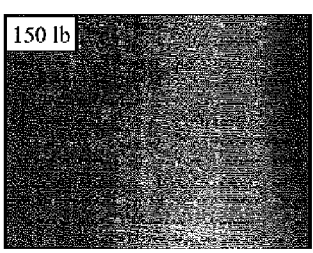
FIG.17A            FIG.17B            FIG.17C
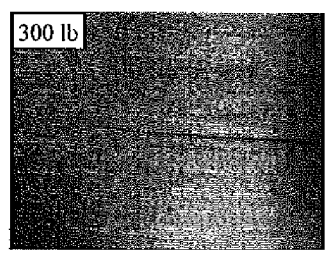 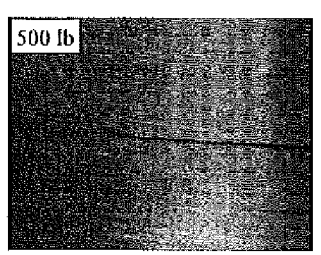
FIG.17D            FIG.17E

PASSIVE WIRELESS ANTENNA SENSOR FOR STRAIN, TEMPERATURE, CRACK AND FATIGUE MEASUREMENT

CROSS-REFERENCE TO RELATED APPLICATIONS

This application is a U.S. National Phase of PCT Application No. PCT/US2009/034175, filed 15 Feb. 2009, which claims priority to U.S. Provisional Patent Application No. 61/029,086, filed 15 Feb. 2008, the entireties of which are herein incorporated by reference.

STATEMENT REGARDING FEDERALLY-SPONSORED RESEARCH OR DEVELOPMENT

This invention was made with government support under FA9550-07-1-0465 awarded by the Air Force Office of Scientific Research. The government has certain rights in the invention.

FIELD OF INVENTION

The present invention relates in general to the field of damage detection, and more particularly, to a passive wireless sensor for strain, temperature, crack and fatigue measurement.

BACKGROUND OF THE INVENTION

Without limiting the scope of the invention, its background is described in connection with patch antennas. One system that uses patch antennas is taught in U.S. Pat. No. 7,006,044, issued to Choi, et al., for a microstrip patch antenna using MEMS technology. Briefly, a microstrip patch antenna is formed by using a microelectromechanical system fabrication technology. The microstrip patch antenna includes: a substrate provided with a ground formed on a bottom surface of the substrate, a feeding line formed on a top surface of the substrate for feeding an electric power, a coupling stub formed on the top surface of the substrate and electrically connected to the feeding line, a plurality of supporting posts erected on the top surface of the substrate, and a radiating patch formed on the supporting posts, thereby forming an area of air between the radiating patch and the top surface of the substrate.

Another system is taught in U.S. Pat. No. 5,970,393, issued to Khorrami, et al., for an integrated micro-strip antenna apparatus and a system that uses wireless communications for sensing and actuation purposes. Briefly, a system is taught for using a number of micro-strip antenna apparatus embedded in or mounted on the surface of a structure for enabling wireless communication of sensed and actuation signals. The microstrip antenna apparatus may include smart materials or other substrates. If only a sensed operation is desired, the microstrip antenna apparatus may be fabricated from only passive elements or materials. Furthermore, a micro-strip antenna apparatus is provided which enables simultaneous transmission/reception of sensing and actuation signals.

Finally, United States Patent Application No. 20070276294, filed by Gupta, et al. now U.S. Pat. No. 8,070,695 B2, teaches a strain monitoring system and apparatus. Briefly, a system for monitoring strain as an indicator of biological conditions, such as spinal fusion, glucose levels, spinal loading, and heart rate is disclosed. The system includes an inter-digitated capacitor sensor, and RF transmitter, and an associated antenna, all of which are microminiature or microscopic in size and can be implanted in a biological host such as a human or animal. An inductively coupled power supply is also employed to avoid the need for implantation of chemical batteries. Power is provided to the sensor and transmitter, and data is transmitted from the sensor, when an external receiving device, such as a handheld RF ID type receiver, is placed proximate the location of the implanted sensor, transmitter and inductively coupled power supply. The implanted sensor, transmitter and inductively coupled power supply can be left in place permanently or removed when desired.

SUMMARY OF THE INVENTION

The present invention can be used to measure one or more parameters, such as strain, temperature, crack, and fatigue, of a wide variety of structures containing metallic, non-metallic, composite, concrete and even living tissue. More specifically, the present invention can measure: (a) strain in the structure by measuring a frequency shift of the resonant frequency of a passive wireless antenna sensor; (b) temperature change of the structure by also measuring the frequency shift; (c) cracks in the structure by measuring the frequency shift and an increase in return loss; and/or (d) fatigue in the structure by measuring an increase in induced return loss. Several advantages have been found by using passive wireless antenna sensors, including, no external power, small size, low manufacturing cost, low profile, light weight, conformability to surfaces and networking capability.

In one embodiment, the present invention includes a method of monitoring a condition of a structure using a passive wireless antenna sensor having a known resonant frequency when mounted on the structure. A series of radio frequency (RF) signals with sweeping frequencies around the known resonant frequency are transmitted to the passive wireless antenna sensor. The passive wireless antenna sensor includes a dielectric substrate disposed between an antenna pattern and a ground plane such that a change in the condition of the structure will cause a change in one or more characteristics of the passive wireless sensor. A signal is received from the passive wireless antenna sensor and a resonant frequency of the passive wireless antenna sensor is determined based on the received signal. The condition of the structure is monitored by comparing the determined resonant frequency of the passive wireless antenna sensor to the known resonant frequency of the passive wireless antenna sensor. A change in the resonant frequency of the passive wireless antenna sensor indicates a change in the condition of the structure.

In another embodiment, the present invention provides an apparatus for monitoring a condition of a structure that includes a monitoring device and a wireless passive wireless antenna sensor mounted on the structure. The passive wireless antenna sensor has a known resonant frequency when mounted on the structure and includes a dielectric substrate disposed between an antenna pattern and a ground plane such that a change in the condition of the structure will cause a change in one or more characteristics of the passive wireless sensor. The monitoring device transmits a series of radio frequency (RF) signals with sweeping frequencies around the known resonant frequency to the passive wireless antenna sensor. When the monitoring device receives a signal from the passive wireless antenna sensor, it determines a resonant frequency of the passive wireless antenna sensor based on the received signal. The condition of the structure is determined by comparing the determined resonant frequency of the passive wireless antenna sensor to the known resonant frequency of the passive wireless antenna sensor. A change in the resonant frequency of the passive wireless antenna sensor indicates a change in the condition of the structure.

The monitoring device or system interrogation system that measures the resonant frequency of the passive wireless antenna sensors may include an antenna reader with a network analyzer, an antenna reader with a scanning RF source, or a broadband RF source and frequency demodulation. Non-limiting examples of passive wireless antenna sensors include a patch antenna, a loop antenna, or a microstrip antenna. Non-limiting examples of antenna readers for use with the present invention include: a horn antenna, a patch antenna, a loop antenna or a lens antenna. In one aspect, the resonant frequency of the passive wireless antenna sensor is remotely measured by backscattering to detect the return loss as a function of frequency or directly measured by a frequency analyzing apparatus. In one aspect, the structure being monitored is a part of the passive wireless antenna sensor and serves as a ground plane for the passive wireless antenna sensor. The passive wireless antenna sensor resonant frequency may be measured remotely by backscattering or directly using a frequency analyzer. The present invention may also include more than one passive wireless antenna sensor, and at least two passive wireless antenna sensors may have different resonant frequencies.

BRIEF DESCRIPTION OF THE DRAWINGS

Further benefits and advantages of the present invention will become more apparent from the following description of various embodiments that are given by way of example with reference to the accompanying drawings:

FIG. 16 is a graph showing the shift of antenna resonant frequency under with different crack length presented in its ground plane in accordance with the present invention; and FIGS. 17A-E are photos showing a crack opening under different loads in accordance with the present invention.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

As will be described in more detail below, the passive wireless antenna sensor of the present invention can be used to measure one or more parameters, such as strain, temperature, crack, and fatigue, of a wide variety of structures containing metallic, non-metallic, composite, concrete and even living tissue. The monitoring device of the present invention can then measure: (a) strain in the structure by measuring a frequency shift of the resonant frequency of the passive wireless antenna sensor; (b) temperature change of the structure by also measuring the frequency shift; (c) cracks in the structure by measuring the frequency shift and an increase in return loss; and/or (d) fatigue in the structure by measuring an increase in induced return loss. Several advantages have been found by using passive wireless antenna sensors, including, no external power, small size, low manufacturing cost, low profile, light weight, conformability to surfaces and networking capability.

Figure 1:
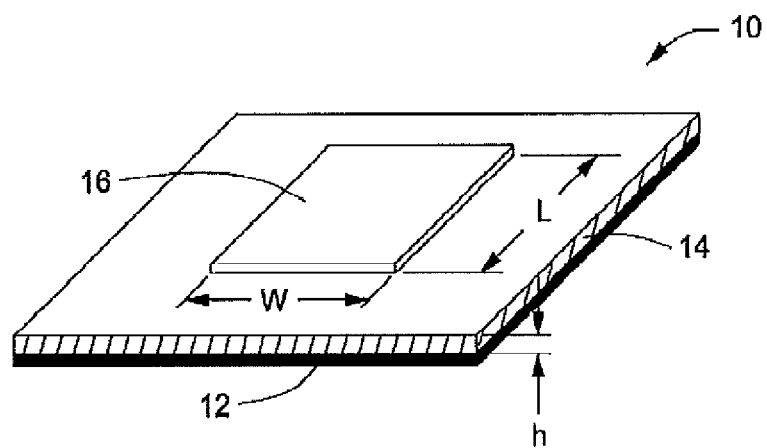
FIG. 1 shows a patch antenna in accordance with the present invention.

Now referring to FIG. 1, a diagram of a typical MM-wave patch antenna 10 is shown. Patch antenna 10 is made on a thin sheet of low-loss insulating material, called the dielectric substrate 14. The dielectric substrate is preferably flexible so that the patch antenna 10 can conform to the shape of the structure being monitored. The antenna pattern can be a metallic patch 16 or a wire/metallic loop printed on one side of the substrate 14. The shape of the antenna pattern can vary depending on the desired operating parameters. A ground plane 12 is coated on the opposite side of the dielectric substrate 14 from the metallic patch 16. The metallic patch 16 and the ground plane 12 form an electro-magnetic (EM) cavity so that a resonance can be generated and the fringing field between the ground plane 12 and the metallic patch 16 can efficiently radiate. Note that the ground plane 12 can be modified or eliminated if the structure on which the patch antenna 10 is to be mounted has a metallic or semi-metallic surface sufficient to function as the ground plane 12.

Figure 2:
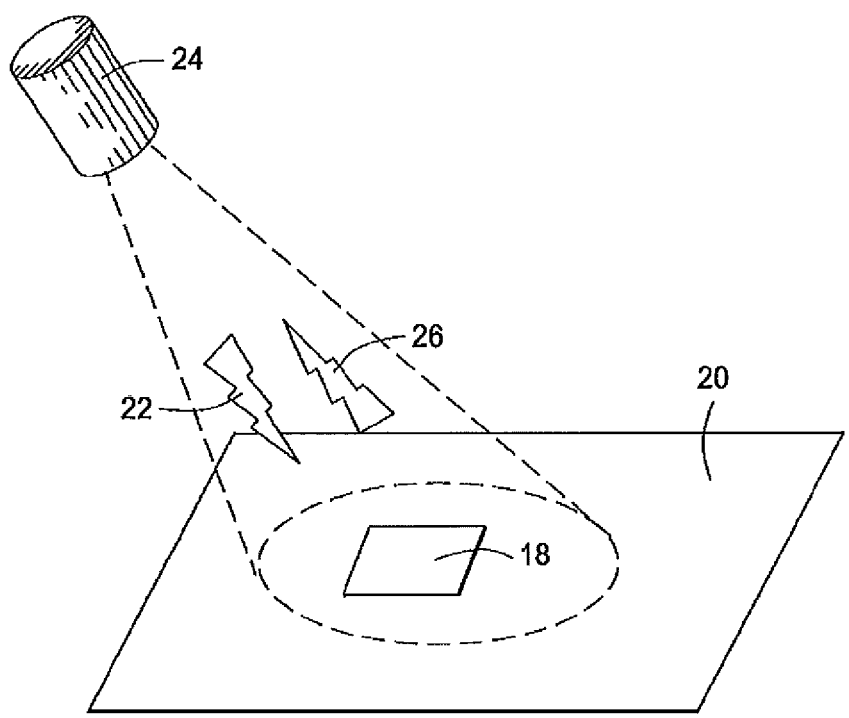
FIG. 2 shows a system for taking antenna measurements using backscattering in accordance with the present invention.

Referring now to FIG. 2, the radiation parameters of a passive wireless antenna sensor 18 can be measured via a non-contact reader, based on the principle of backscattering. The passive wireless antenna sensor 18 can be a patch antenna 10 (FIG. 1), a loop antenna, a microstrip antenna or other suitable antenna. The passive wireless antenna sensor 18 is mounted on a structure 20 to be monitored, such as a building, bridge, equipment, part of a living body, etc. As previously mentioned, the passive wireless antenna sensor 18 is preferably made of a flexible material so that the passive wireless antenna sensor 18 can conform to the shape of the structure 20 being monitored. The passive wireless antenna sensor 18 is placed in the path of a reader 24 (or vice versa) that serves as both the transmitter and the receiver (e.g., a transceiver). The reader (monitoring device) 24 can be a fixed device, portable device or handheld device. As a transmitter, the reader 24 sends an incident electromagnetic (EM) wave 22 toward the passive wireless antenna sensor 18. Upon interception by the passive wireless antenna sensor 18, the incident EM wave 22 is scattered back as a reflected EM wave 26 by the passive wireless antenna sensor 18 if the frequency of the incident wave matches the resonant frequency of the passive wireless antenna sensor 18. The backscattered or reflected EM wave 26 is then received by the reader 24. From the amplitude and the frequency of the received EM wave, the antenna radiation parameters (resonant frequency, return loss, etc.) can be measured. The reader 24 can be configured to measure the antenna radiation parameters continuously, periodically, randomly or as initiated by a user. Passive wireless antenna sensor 18 return loss is defined as the ratio between the amplitudes of the backscattered EM wave 26 and the incident EM wave 22 while the antenna resonant frequency is defined as the frequency at which the passive wireless antenna sensor 18 has the minimum return loss.

Figure 3A:
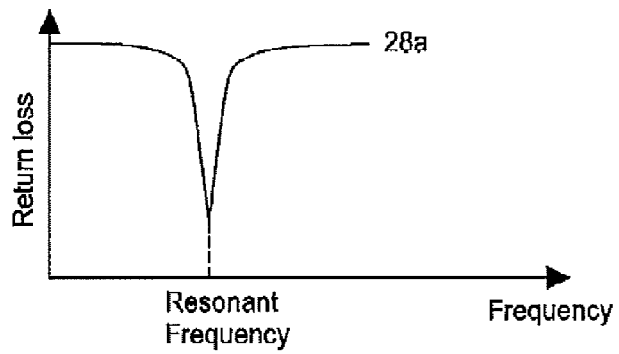
FIGS. 3A-3B are graphs illustrating the detection of cracks from the radiation parameters of a passive wireless antenna sensor in accordance with the present invention.
Figure 3B:
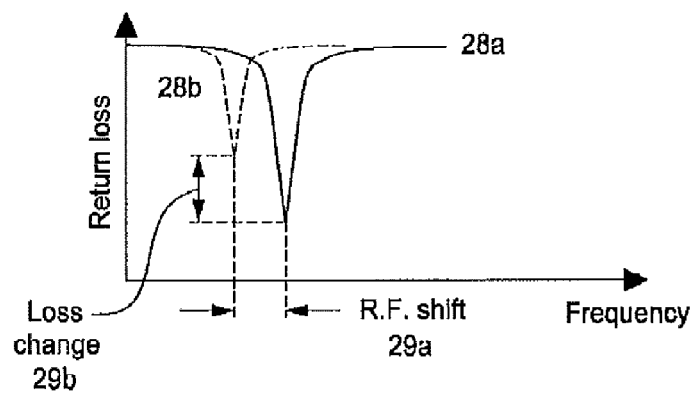

A typical return loss versus frequency diagram of a passive wireless antenna sensor 18 is shown in FIGS. 3A and 3B. As shown in FIG. 3A, a passive wireless antenna sensor 18 generally has a narrow bandwidth. Therefore, the passive wireless antenna sensor 18 can only backscatter EM waves whose frequencies fall within a narrow frequency band. Outside of the resonant frequency band, the passive wireless antenna sensor 18 is substantially invisible to the reader 24. The frequency response of the passive wireless antenna sensor 18 is dependent on the characteristics of the passive wireless antenna sensor 18: (a) the dimensions of the passive wireless antenna sensor 18; (b) the dielectric properties of the passive wireless antenna sensor 18 (e.g., substrate 14); (c) the surface roughness of the antenna pattern (e.g., metal patch 16); and (d) the presence of a crack in the ground plane 12 caused by a crack in the structure 20 (or a crack in the metallic structure 20 that is performing the function of the ground plane 12) to which the passive wireless antenna sensor 10 is mounted. FIG. 3B illustrates two possible modulations of the antenna radiation parameters: (a) resonant frequency shift 29a (change in frequency between a known resonant frequency 28a and a determined (detected) resonant frequency 28b); and (b) a return loss change 29b (change in return loss between a known resonant frequency 28a and a determined (detected) resonant frequency 28b). Note that the known resonant frequency can be: (a) an original resonant frequency of the passive wireless antenna sensor when the passive wireless antenna sensor was mounted on the structure; or (b) one or more previously determined resonant frequencies of the passive wireless antenna sensor. The resonant frequency shift 29a can be used for strain measurement and temperature measurement. The resonant frequency shift 29a and return loss change 29b can be used for crack detection. The return loss change 29b can be used for fatigue detection.

Now referring both to FIG. 2 and FIG. 3B, the present invention provides an apparatus and a method of monitoring a condition of a structure 20 using a passive wireless antenna sensor 18 having a known resonant frequency 28a when mounted on the structure 20. The monitoring device (antenna reader 24 connected to a RF source) transmits a series of radio frequency (RF) signals 22 with sweeping frequencies around the known resonant frequency 28a to the passive wireless antenna sensor 18. The passive wireless antenna sensor 18 includes a dielectric substrate disposed between an antenna pattern and a ground plane such that a change in the condition of the structure 20 will cause a change in one or more characteristics of the passive wireless sensor 18. The monitoring device (antenna reader 24 connected to a frequency detector) then receives a signal 26 from the passive wireless antenna sensor 18 and determines a resonant frequency 28b of the passive wireless antenna sensor 18 based on the received signal 26. The determined resonant frequency 28b of the passive wireless antenna sensor 18 is compared to the known resonant frequency 28a of the passive wireless antenna sensor 18. A change in the resonant frequency of the passive wireless antenna sensor 18 indicates a change in the condition of the structure 20. The known resonant frequency 28a, the determined resonant frequency 28b, a change in the resonant frequency (29a and/or 29b), and other relevant data can be stored and retrieved from a data storage device. Moreover, the monitoring device (reader 24) can notify a user of the change in condition of the structure or when new data is received. Similarly, the monitoring device (reader 24) can notify a user of the change in condition of the structure only when the change in resonant frequency exceeds a threshold value.

Figure 4:
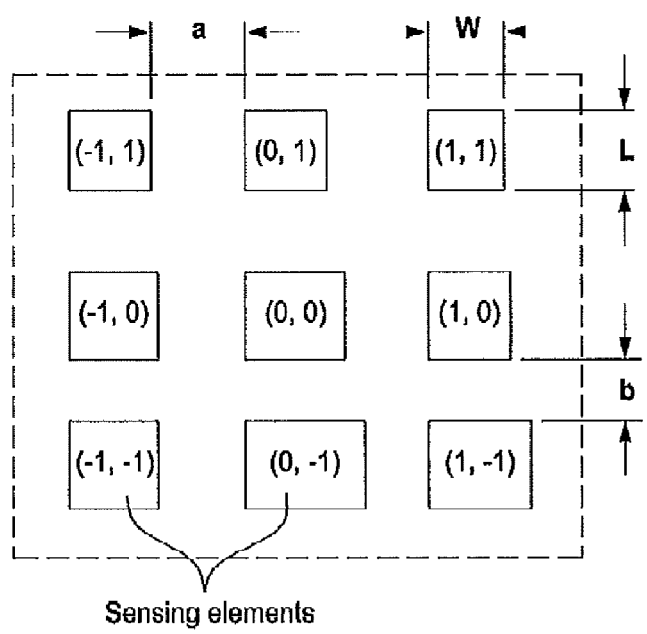
FIG. 4 shows an antenna sensing network in accordance with the present invention.

A single passive wireless antenna sensor 18 can only detect local cracks developed in the vicinity of the antenna, which requires a priori knowledge of the crack location. Unfortunately, in areas with a complex geometry and stress distribution, the exact locations where small cracks will emerge are impossible to predict due to the stochastic nature of the crack initiation process. Because the crack locations are unknown in advance, a sensing network or array patterned with multiple sensing elements (i.e., passive wireless antenna sensors 18) can be employed to provide distributed sensing capabilities over a large area. A diagram of the antenna sensing network is shown in FIG. 4. The distances between the antennas and the antenna sizes are in the order of several millimeters. A properly designed antenna sensing network will be able to detect any cracks longer than 1 mm, regardless of their locations. Each passive wireless antenna sensor 18 will function independently and has its unique transmission bands. The passive wireless antenna sensors 18 within the network or array are individually addressable and frequency division is used to multiplex the signals to the passive wireless antenna sensors 18. As a result, each passive wireless antenna sensor 18 has a different known resonant frequency. Note that tunable passive wireless antenna sensors can be used. For example, a passive wireless antenna sensor 18 can be made to be tunable by fabricating a crack in the ground plane and attaching a mechanical actuator to the ground plane to open or close the fabricated crack.

Figure 5A:
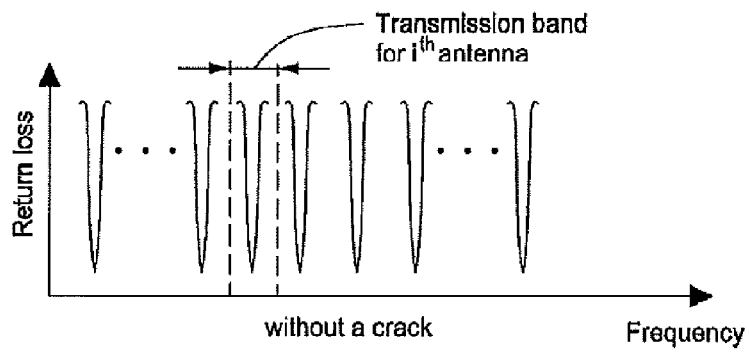
FIGS. 5A and 5B are graphs illustrating the multiplexing of the passive wireless antenna sensor using frequency division and the detection of cracks using an antenna sensing network in accordance with the present invention.
Figure 5B:
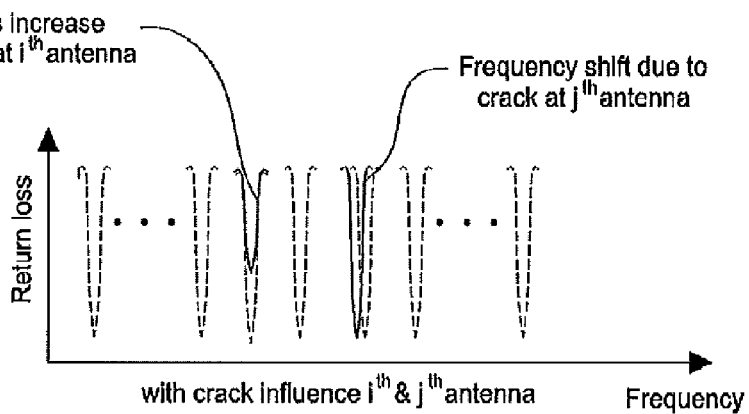

Now referring to FIGS. 5A-5B, graphs illustrating the detection of cracks using an antenna sensing network are shown. As shown in FIG. 5A, the entire spectrum of the sensing network is a concatenation of the transmission bands of the individual antennas. The resonance frequencies and the return losses of the antennas are interrogated using a MM-wave reader 24 that scans the entire spectrum of the sensing network. Before a crack emerges, the sensing network serves as a full-field strain gauge that measures strain-induced antenna elongation at the antenna locations. Once cracks are developed in the primary structure, the antennas directly above these small cracks will be able to measure the crack length from the corresponding frequency shift (FIG. 5A). The difference between resonant frequency shift due to elongation and due to small cracks is that the elongation induced frequency shifts are most likely to be continuous across several adjacent antennas while the crack induced frequency shift is more likely to be limited to the antenna directly above the crack. As the crack length increases, the return loss of the antenna covering the crack will increase dramatically (FIG. 5B). Eventually, when the crack length is comparable to the antenna width, the return loss has increased to such a level that the antenna can no longer radiate. At this point, the antenna is damaged. Since each antenna operates independently, damaging one antenna will not interrupt the functionality of the other antennas. For a crack spanning several antennas, the orientation and the length of the crack can be determined from a cluster of antennas whose radiation parameters are altered. In addition, two cracks are considered to be interacting when their crack-tip plastic zones start to join up. By monitoring the surface roughness induced return loss increases, it is feasible to detect the onset of crack interaction.

Strain measurement will now be described. Based on the transmission line model, the resonant frequency of a rectangular patch antenna 10 is calculated as:

$$f_r = \frac{c}{2\sqrt{\varepsilon_{re}}} \frac{1}{L + 2\Delta L_{oc}}. \quad \text{Equation (1)}$$

The effective dielectric constant $\varepsilon_{re}$ is related to the dielectric constant of the substrate $\varepsilon_r$, the substrate thickness h, and the patch width w, i.e., $$\varepsilon_{re} = \frac{\varepsilon_r + 1}{2} + \frac{\varepsilon_r - 1}{2\sqrt{(1 + 10h/w)}}. \quad \text{Equation (2)}$$

The line extension $\Delta L_{oc}$ is calculated from the effective dielectric constant $\varepsilon_r$, the substrate thickness h, and the patch width w, $$\Delta L_{oc} = 0.412h \frac{(\varepsilon_{re} + 0.3)(w/h + 0.264)}{(\varepsilon_{re} - 0.258)(w/h + 0.813)}. \quad \text{Equation (3)}$$

Assuming the patch antenna 10 is subjected to a tensile strain $\varepsilon_L$ along the length direction, the patch width and the substrate thickness will change due to Poisson's effect, i.e.

$$w = (1 - v_p \varepsilon_L) w_0, \text{ and } h = (1 - v_s \varepsilon_L) h_0. \quad \text{Equation (4)}$$

If the Poisson's ratios of the metallic patch and the substrate material, $v_p$ and $v_s$, are the same, the ratio w/h remains to be a constant as the tensile strain $\varepsilon_L$ changes, which means that $\varepsilon_{re}$ in Equation (2) is independent of $\varepsilon_L$ and $\Delta L_{oc}$ in Equation (3) is proportional to the substrate thickness h. Therefore, the resonant frequency in Equation (1) can be expressed as:

$$f_r = \frac{c}{2\sqrt{\varepsilon_{re}}} \frac{1}{L + 2\Delta L_{0C}} = \frac{C_1}{L + C_2 h}, \quad \text{Equation (5)}$$

$$\text{where: } C_1 = \frac{c}{2\sqrt{\varepsilon_{re}}}; \text{ and}$$

$$C_2 = 0.812 \frac{(\varepsilon_{re} + 0.3)(w/h + 0.264)}{(\varepsilon_{re} - 0.258)(w/h + 0.813)}.$$

The strain-induced elongation, therefore, will shift the antenna resonant frequency. At an unloaded state, the antenna frequency, $f_{ro}$ is calculated from the antenna length $L_o$ and substrate thickness $h_o$:

$$f_{ro} = \frac{C_1}{L_0 + C_2 h_0}. \quad \text{Equation (6)}$$

Under a strain $\varepsilon_L$, the antenna frequency shifts to $$f_r(\varepsilon_L) = \frac{C_1}{L_0(1 - \varepsilon_L) + C_2 h_0 (1 - v \varepsilon_L)}. \quad \text{Equation (7)}$$

Combining Equation (6) and (7), the relationship between the strain $C_L$ and the frequency shift can be established $$\varepsilon_L = -\frac{L_0 + v_s C_2 h_0}{L_0 + C_2 h_0} \frac{\Delta f}{f_{ro} + \Delta f} = C \frac{\Delta f}{f_{ro} + \Delta f}, \quad \text{Equation (8)}$$

where $\Delta_f = f_r - f_{ro}$. Analyzing the constant C indicates that the sensitivity of frequency shift to the applied strain is strongly governed by the dielectric constant of the substrate material.

Crack detection will now be described. A crack developed in the ground plane 12 of the patch antenna 10 will shift the resonant frequency and change the return loss of the patch antenna 10. Therefore, surface cracks in the structures can be characterized by two mechanisms, depending on whether the material is conductive or not. If the structure component is made of metallic material, the structure itself can serve as the ground plane for the antenna; therefore, surface cracks developed in the structure will be detected as cracks in ground plane almost immediately after crack initiation. If the structure is made of non-conducting materials, however, the crack will be detected only after it causes a crack in the ground plane of the antenna.

Fatigue monitoring will now be described. In addition to strain-induced elongation and ground plane cracks, it is well known to the antenna designers that the antenna return loss increases if the surface roughness of the antenna metallic components increases. Since plastic deformations cause surface roughening in metallic materials, a patch antenna 10 experiencing plastic deformations in its metallic elements may display a large return loss. This surface roughening-induced return loss increases can be exploited for plastic deformation characterization.

Temperature measurement and sensing for other parameters will now be described. The same sensing principle can be applied for measurement of other physical parameters that will change the dimension of the patch antenna 10 or dielectric property of the substrate materials 14. For example, temperature can be measured either from the patch dimension change due to thermal expansion/contraction or from the change of conductivity of the substrate material 14 at extremely high temperatures.

Now briefly referring back to FIG. 1, a passive wireless antenna sensor 18 using a patch antenna 10 for strain measurement will now be described. A rectangular patch antenna 10 of 8 mm in length and 4 mm in width is designed to operate at 20 GHz. The metallic patch 16 in this example is fabricated from copper on a flexible substrate 14 (here, Kapton polyimide film) by conventional IC fabrication processes (such as but not limited to photolithography, deposition, and liftoff). The thickness of the exemplary Kapton substrate 14 is 50 μm and the thickness of the metallic patch 16 is 1 μm. A patch antenna 10 was attached to a test specimen with its feed soldered to a SubMiniature version A (SMA) connector.

The patch antennas 10 were tested under tension to evaluate whether the copper film comprising the metallic patch 16 will remain intact under loading. It has been observed that microcracks start to develop in the copper film when the strain was increased to 5%.

In this example, the structure is an aluminum cantilever test specimen is designed to have a strain of 1% at the sensor location when it is subjected to a 50 pound load. The patch antenna 10 was bounded to the specimen using a conventional strain gauge epoxy. Briefly, one end of the cantilever is clamped to a workbench and the other end of the cantilever is loaded by a weight. The SMA connector of the patch antenna is connected to the network analyzer. The S11 scattering parameter was measured to determine the frequency response of the patch antenna 10.

Figure 6:
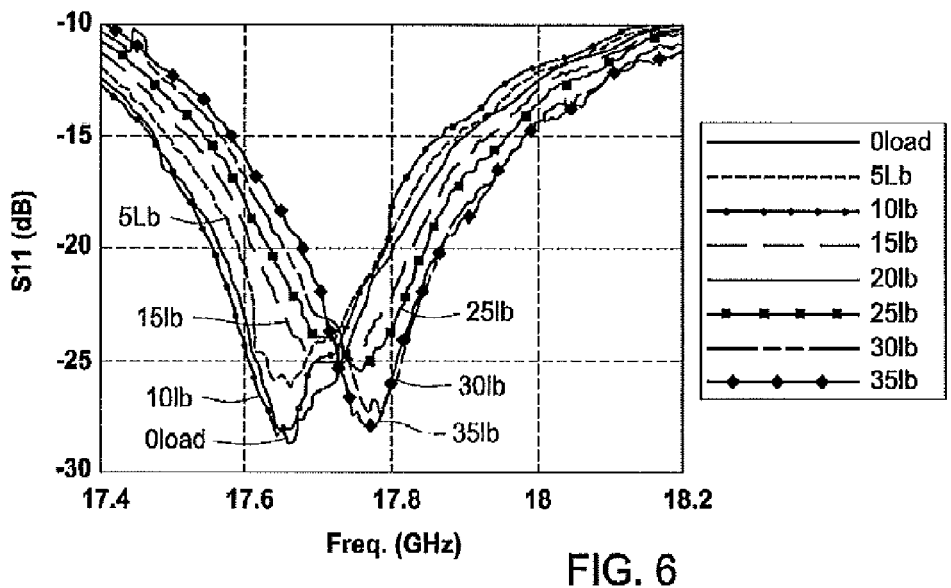
FIG. 6 is a graph showing the frequency versus return loss characteristics at different loadings/strains in accordance with the present invention.

Referring now to FIG. 6, the patch antenna 10 was loaded in an increment of 5 lb (which corresponds to 0.1% strain increase) until the total load reached 35 pounds. FIG. 6 shows the frequency vs. return loss characteristics of the antenna under different loadings. Based on the theoretical analysis of patch antenna, the resonant frequency of a patch antenna should decrease linearly with an increase in its dimension. As a result, the frequency response of the antenna should shift to the left if a tensile strain is applied to the antenna. The results shown in FIG. 6 clearly demonstrate the parallel shifts of the antenna frequency response as the applied load increases. The measurements were repeatable up to 1% strain, the maximum strain applied to the specimen.

Figure 7:
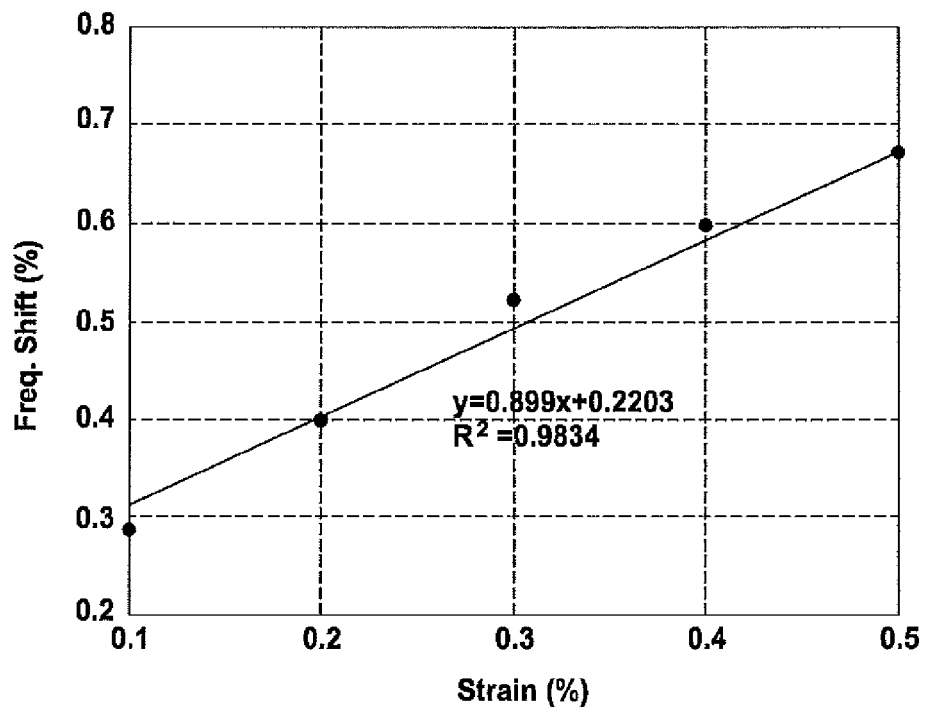
FIG. 7 is a graph showing the strain versus relative frequency change of a passive wireless antenna sensor in accordance with the present invention.

Now referring to FIG. 7, the relationship between the shift in frequency and the applied strain is shown. First, the resonant frequency of the patch antenna 10 under zero loading is calculated from the antenna frequency response. The shifts of the frequency response under different loadings were obtained by interpolating the frequency values at a particular return loss value. Based on the linear fitting of the data, the sensitivity of the strain sensor calculated to be 15 kHz/microstrain. The sensitivity can be increased further by designing the patch antenna 10 to operate at a higher resonant frequency.

Figure 8:
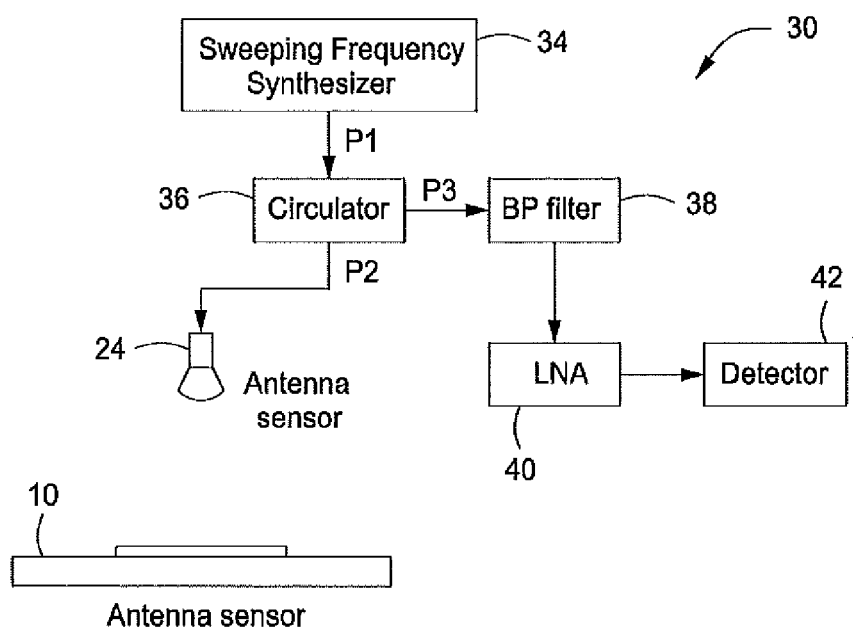
FIG. 8 shows a passive wireless antenna sensor resonant frequency measurement system in accordance with the present invention.

Referring now to FIG. 8, a passive wireless antenna sensor interrogation system 30 can be used to wirelessly measure the resonant frequency shift of the passive wireless antenna sensor 18. Passive wireless antenna sensor 18 can be a patch antenna 10 (FIG. 1), a loop antenna, a microstrip antenna or other suitable antenna. A sweeping frequency synthesizer 34 generates a series of RF signals with a sweeping frequencies centered at the resonance frequency of the unloaded passive wireless antenna sensor 18 through a circulator 36. An antenna reader 24 includes a transceiver that transmits and detects a signal from the passive wireless antenna sensor 18, and the data is then sent to a band-pass filter 38, after which the backscattered signal will be amplified at low noise amplifier (LNA) 40 and detected by a RF power detector 42. Only when the transmitting signal matches with the resonant frequency of patch passive wireless antenna sensor 18 under test, the detector 42 will receive a large backscattered signal. At other frequencies, only noise is detected. Because the patch passive wireless antenna sensor 18 has a very high Q value, the resolution of the frequency measurement systems is likely to be determined by the resolution of the sweeping frequency synthesizer 34, which can be as small as 0.01 Hz. Therefore, the patch passive wireless antenna sensor 18 is expected to have super-high strain sensitivity.

Figure 9:
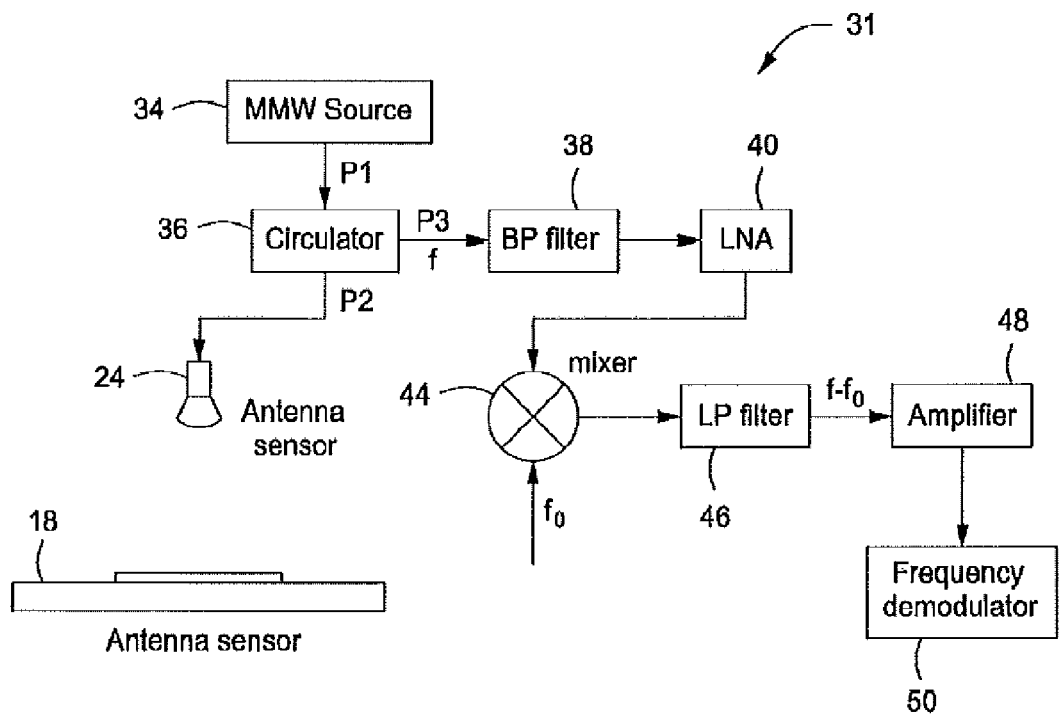
FIG. 9 shows an antenna resonant frequency measurement using a radio system in accordance with the present invention.

Alternatively, a radio system 31 can be used to measure the resonant frequency shift of the passive wireless antenna sensor at high speed, as shown in FIG. 9. In this example, the backscattered signal can be down-converted to a lower frequency signal by mixing it with a reference signal that has the same frequency as the resonant frequency of the unloaded passive wireless antenna sensor. A sweeping frequency synthesizer 34 generates a series of RF signals with a sweeping frequencies centered at the resonance frequency of the unloaded passive wireless antenna sensor 18 through a circulator 36. An antenna transceiver 24 transmits and detects a signal from the passive wireless antenna sensor 18, and the signal is then sent to a band-pass filter 38, and after passing through a band-pass filter 38, the frequency of the filtered signal is the same as the resonance frequency shift of the passive wireless antenna sensor 18 under detection, which will be in the range of zero to a few hundred Mega-Hertz. Conventional RF frequency demodulator can then be employed to measure this frequency shift, which can easily achieve a frequency resolution of a few kilo-Hertz. In this embodiment, the signal is mixed at a mixer 44 and sent into low-pass filter 46, amplified at amplifier 48 and into a frequency modulator 50.

Figure 10:
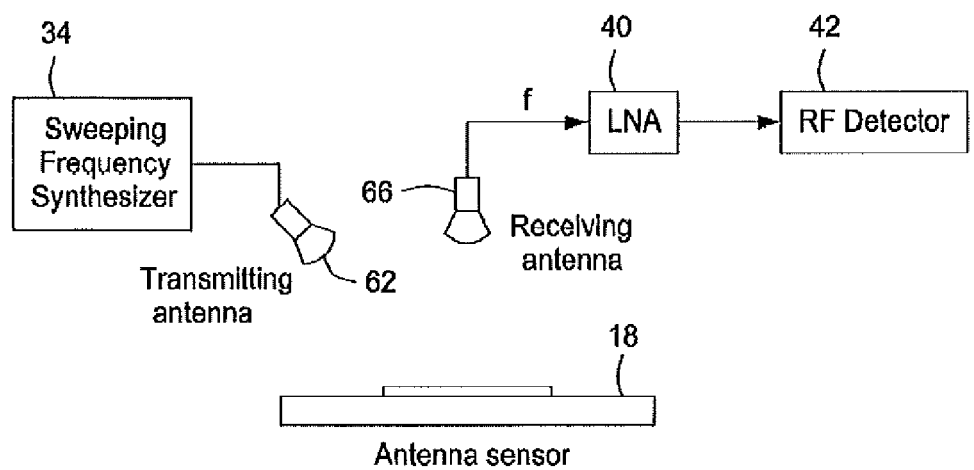
FIG. 10 shows a bistatic passive wireless antenna sensor resonant frequency measurement system in accordance with the present invention.
Figure 11:
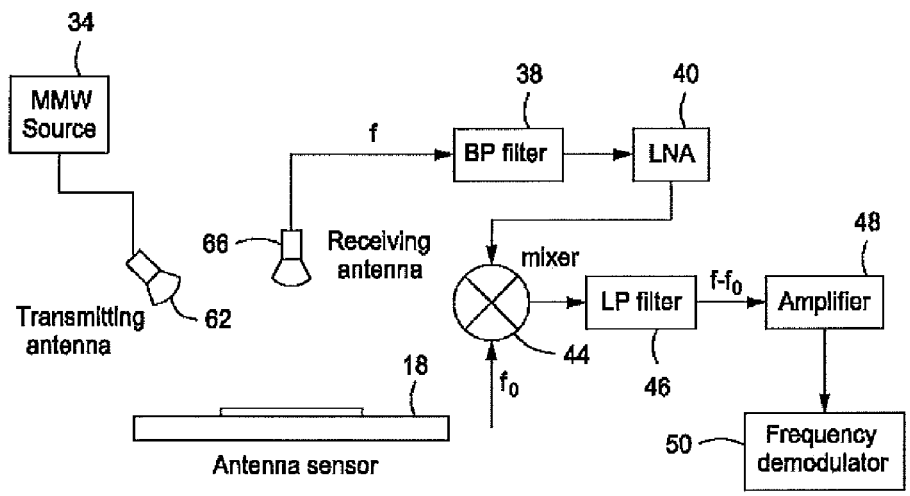
FIG. 11 shows an antenna resonant frequency measurement using a bistatic radio system in accordance with the present invention.

The two monostatic measurement systems shown in FIGS. 8 and 9 can be replaced with their respective bistatic measurement systems as shown in FIG. 10 and FIG. 11, in which two antennas were employed, one for transmitting and one for receiving. Transmitting antenna 62 is under the control of a sweeping frequency synthesizer 34. The signal strikes the path passive wireless antenna sensor 18 and the reflected signal arrives at receiving antenna 66, which then sends the signal into the low noise amplifier 40 and into the RF detector 42. Alternatively, two antennas are also shown in FIG. 10, in this case, the signal is processed as in FIG. 8, in which the signal passes through band-pass filter 38 into mixer 44 and sent into low-pass filter 46, amplified at amplifier 48 and finally into a frequency modulator 50.

Figure 12:
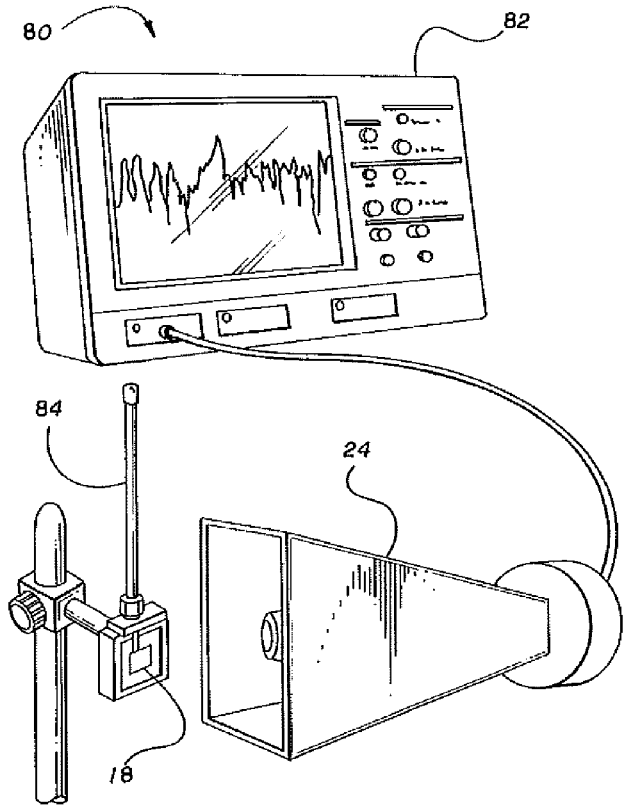
FIG. 12 shows a wireless interrogation passive wireless antenna sensor in accordance with the present invention.

An experimental setup 80 for wireless interrogation of the passive wireless antenna sensor 18 will now be described in reference to FIG. 12. The passive wireless antenna sensor 18 is placed at a distance of 12 inches from the reader 24, which is a broadband horn antenna. The radio frequency (RF) signal generated by a Vector Network Analyzer (VNA) 82 is transmitted to the antenna reader 24 via a coax cable. This signal is subsequently broadcasted to the passive wireless antenna sensor 18 by the antenna reader 24. The signal backscattered by the passive wireless antenna sensor 18 consists of two modes: the antenna scattering mode and the structure scattering mode. The antenna scattering mode is the reradiating of the signal received by the passive wireless antenna sensor 18. It has the same frequency as the radiation spectrum of the passive wireless antenna sensor 18. The structure scattering mode is the signal that is reflected by the ground plane 12 and the surrounding structures of the passive wireless antenna sensor 18. Because the structure scattering mode is much stronger than the antenna scattering mode, it is difficult to determine the resonant frequency of the passive wireless antenna sensor 18 from the backscattered signal if spectrum analysis is performed on the backscattered signal directly. In order to separate the antenna scattering mode from the structure scattering mode, a short cable 84 is connected to the passive wireless antenna sensor 18 to introduce a small delay between the antenna mode and structure mode. The signal received by the passive wireless antenna sensor 18 propagates in the cable 84 first. If the cable 84 is open, this received signal is reflected back at the end of the cable 84 and is reradiated by the passive wireless antenna sensor 18. The signal is delayed by the time it travels in the cable 84.

Figure 13:
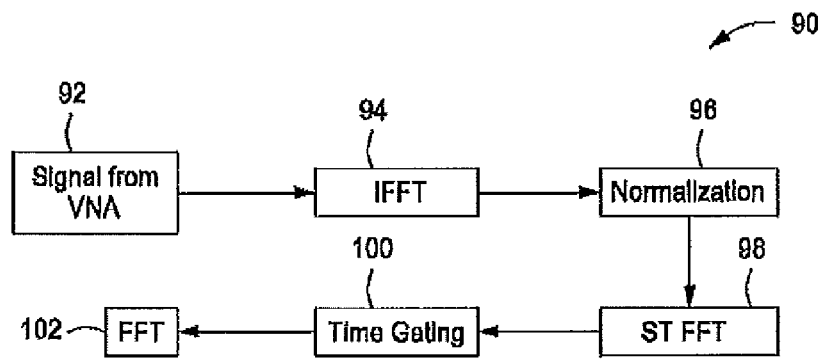
FIG. 13 shows a block diagram of a procedure for signal processing in accordance with the present invention.
Figure 14A:
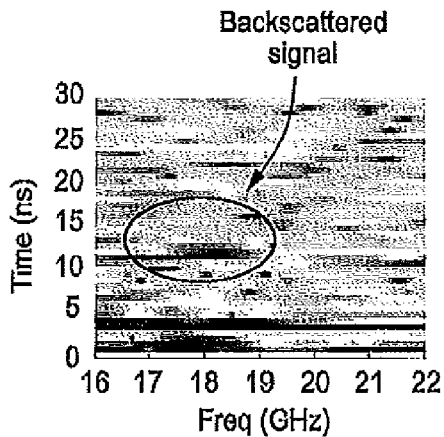
FIGS. 14A-C are graphs showing signal processing to determine the resonant frequency of passive wireless antenna sensor from the backscattered signal in accordance with the present invention.
Figure 14B:
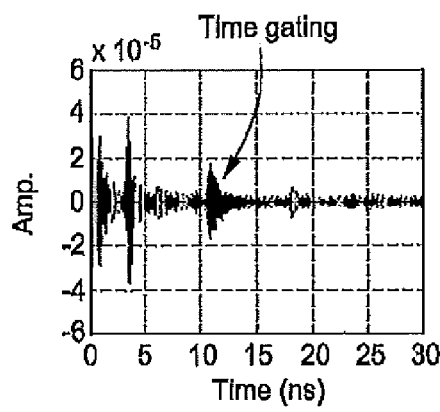
Figure 14C:
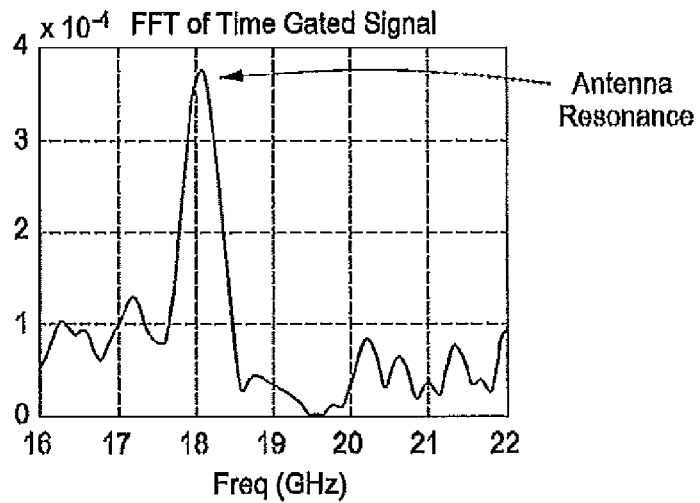

In order to determine the resonant frequency of the passive wireless antenna sensor 18 from the backscattered signal, digital signal processing is needed. The procedure 90 for performing this data processing is shown in FIG. 13. The frequency domain backscattered signal 92 recorded by a VNA is converted to time domain first using Inverse Fast Fourier Transformation (IFFT) 94. To increase the signal-to-noise ratio, the time-domain signal is also subtracted with the time-domain signal collected when the passive wireless antenna sensor 18 is not present or the time-domain signal when the cable 84 is connected to a matched load (normalization 96). Short Time Fast Fourier Transformation (ST FFT) 98 is then performed on the normalized signal 96 and its spectrogram is plotted. The multi-resolution spectrogram presents the frequency components of the normalized signal in both time domain and in frequency domain, as shown in FIG. 14A. At the beginning (0~3 ns), the signal is mainly contributed from the reflection within the horn antenna. The signal from 3-5 ns is from the structure scattering term and the signal from 10-15 ns is the signal backscattered by the passive wireless antenna sensor 18. The delay between the structure mode and the antenna mode is around 6 ns, which is approximately the same as the time it takes the received signal to travel round trip in the 3 ft cable 84. After the time at which the passive wireless antenna sensor 18 scattering term occurs is determined from the spectrogram, the time-domain signal is time gated 100 using a Hanning window (see FIG. 14B). Fast Fourier Transformation (FFT) 102 is then performed on the time gated Hanning windowed signal 100 and the resonant frequency of the passive wireless antenna sensor 18 can be determined (see FIG. 14C). It is contemplated that the cable 84 can be replaced with a delay line incorporated in the antenna design.

Figure 15:
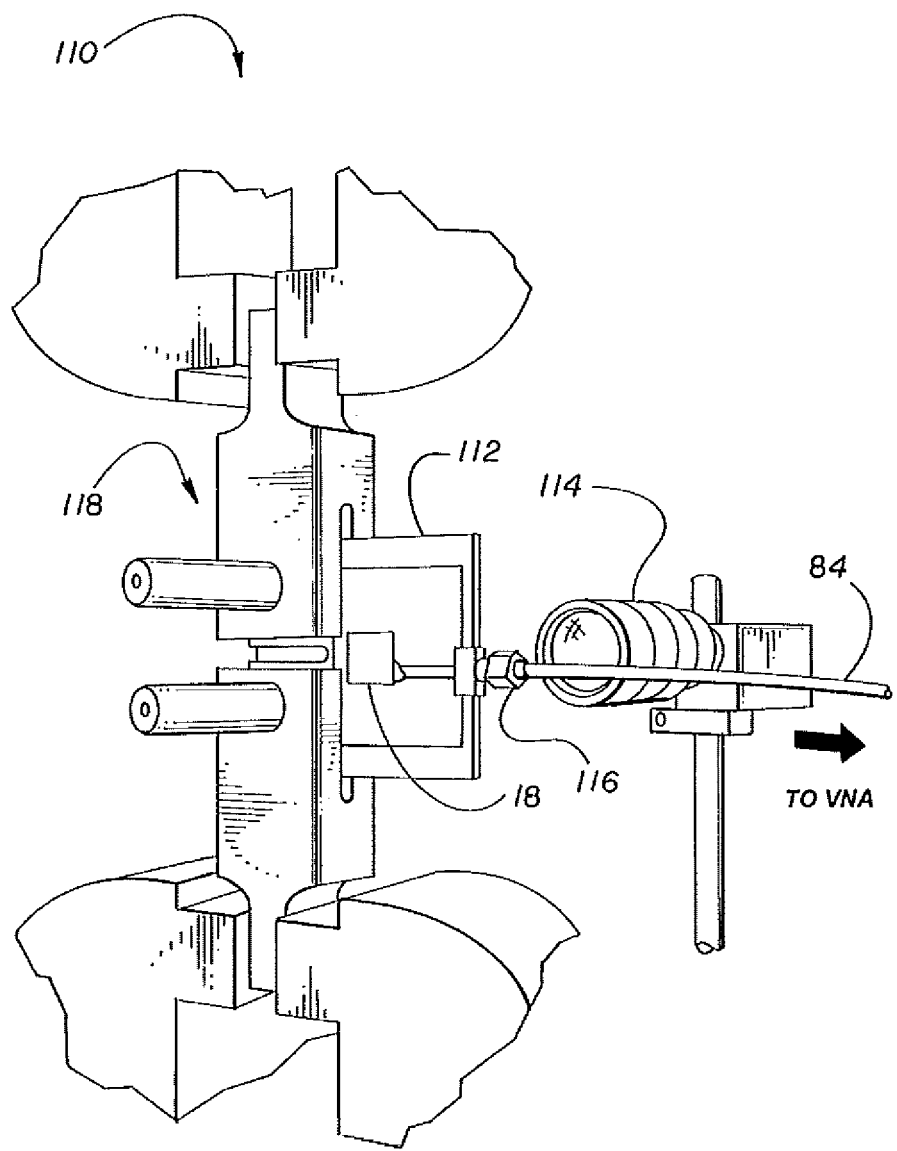
FIG. 15 shows a setup for crack detection using a passive wireless antenna sensor in accordance with the present invention.

The passive wireless antenna sensor's capability to detect cracks was evaluated using the experiment setup 110 shown in FIG. 15. The specimen 112 is a precracked fatigue sample with the passive wireless antenna sensor 18 bonded on top of the crack, covering the end of the crack. A digital camera 114 was used to inspect the crack opening. The passive wireless antenna sensor 18 is connected to the vector network analyzer (VNA) via a suitable coupling mechanism such as the SMA connector 116 that is shown. Load was applied to the fatigue specimen 112 at increments of 50 lbs using a mechanical tester 118. The shift of the resonant frequency of the passive wireless antenna sensor 18 with the applied loads is shown in FIG. 16. From 0-100 lb, the resonant frequency only shifted slightly. This is because the crack did not open much at low loads (see FIGS. 17A-E) and the frequency shift is mainly due to strain increase. As shown in FIGS. 17B, 17C and 17D, the crack gradually opened up from 100 lb to 300 lb. As a result, the frequency shifted significantly to lower frequencies. After 300 lb, the crack is fully opened as shown in FIG. 17D (3001*b*) and FIG. 17E (5001*b*). The shift of the frequency from 300-600 lb is again due to strain increase, which is much smaller than the frequency shifts induced by crack opening.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. A method of monitoring a condition of a structure using a passive wireless antenna sensor having a known resonant frequency when mounted on the structure, comprising:

transmitting a series of radio frequency (RF) signals with sweeping frequencies around the known resonant frequency to the passive wireless antenna sensor, wherein the passive wireless antenna sensor comprises an antenna comprising a dielectric substrate disposed between an antenna pattern and a ground plane such that a change in the condition of the structure being monitored will directly cause a change in at least one characteristic of the antenna, wherein the characteristic includes a crack in the ground plane;

receiving a backscattered signal from the passive wireless antenna sensor, wherein the backscattered signal comprises an antenna backscattered signal and a structure backscattered signal, and the antenna backscattered signal is delayed with respect to the structure backscattered signal, such that the structure backscattered signal is received before the antenna backscattered signal;

determining a resonant frequency of the passive wireless antenna sensor based on the antenna backscattered signal; and using a digital signal processor, determining the condition of the structure by comparing the determined resonant frequency of the passive wireless antenna sensor to the known resonant frequency of the passive wireless antenna sensor, whereby a change in the resonant frequency of the passive wireless antenna sensor indicates a change in the condition of the structure, including a detected crack in the structure.

2. The method as recited in claim 1, wherein determining the resonant frequency of the passive wireless antenna sensor comprises:

converting the backscattered signal received from the passive wireless antenna sensor to a time-domain signal using an Inverse Fast Fourier Transformation;

normalizing the time-domain signal;

creating a spectrogram for the normalized time-domain signal using a Short Time Fast Fourier Transformation;

determining a time at which the antenna backscattered signal occurs using the spectrogram;

time gating the normalized time-domain signal using a Hanning window and the determined time at which the antenna backscattered signal occurred; and determining the resonant frequency of the passive wireless sensor from the time gated Hanning windowed signal using a Fast Fourier Transformation.

3. The method of claim 1, further comprising:

saving the determined resonant frequency in a data storage device;

saving the change in the resonant frequency in the data storage device;

retrieving the known resonant frequency from the data storage device; and notifying a user only when the change in the resonant frequency exceeds a threshold value.

4. The method of claim 1, wherein the known resonant frequency comprises:

an original resonant frequency of the passive wireless antenna sensor when the passive wireless antenna sensor was mounted on the structure; or at least one previously determined resonant frequency of the passive wireless antenna sensor.

5. The method of claim 1, wherein:

the characteristic of the passive wireless antenna sensor further comprises at least one of (a) a dimension of the passive wireless antenna sensor, (b) a dielectric property of the passive wireless antenna sensor, and (c) a surface roughness of the antenna pattern;

the change in the resonant frequency comprises at least one of a frequency shift, a return loss, and a combination thereof; and the change in the condition of the structure further comprises at least one of a strain on the structure along a length direction of the antenna, a temperature change of the structure, a change in a known crack in the structure, a fatigue of the structure, and a combination thereof.

6. The method of claim 1, wherein:

the ground plane comprises a metallic or semi-metallic surface of the structure on which the passive wireless antenna sensor is mounted;

the passive wireless antenna sensor comprises a loop antenna, a patch antenna or a microstrip antenna;

transmitting and receiving are performed by an antenna reader connected to a RF source and a frequency detector; and the structure comprises a metallic material, a non-metallic material, a composite material, a concrete material or a living tissue.

7. The method of claim 6, wherein:

the antenna reader comprises a horn antenna, a patch antenna, a loop antenna or a lens antenna;

the antenna reader further comprises a transceiver connected to a circulator, or a transmitter and a receiver;

the RF source comprises a sweeping frequency synthesizer, a scanning RF source, a broadband RF source, or a vector spectrum analyzer; or the frequency detector comprises: (a) a bandpass filter connected to a low noise amplifier connected to a RF power detector, (b) a bandpass filter connected to a low noise amplifier connected to a mixer connected to a low-pass filter connected to an amplifier connected to a frequency demodulator, (c) a low noise amplifier connected to a RF power detector; or (d) a vector network analyzer.

8. The method of claim 1, wherein the passive wireless antenna sensor comprises an array or network of individually addressable passive wireless antenna sensors and frequency division is used to multiplex the signals to the passive wireless antenna sensors.

9. The method of claim 1, wherein at least two passive wireless antenna sensors are used and each passive wireless antenna sensor has a different known resonant frequency.

10. The method of claim 1, wherein the passive wireless antenna sensor is tunable.

11. The method of claim 1, wherein the passive wireless antenna further comprises:

a crack fabricated in the ground plane; and a mechanical actuator attached to the ground plane to open or close the fabricated crack.

12. The method of claim 1, wherein the time delay is introduced in the antenna backscattered signal by a cable connected to the passive wireless antenna sensor.

13. The method of claim 12, wherein the series of RF signals transmitted to the passive wireless antenna propagate through the cable, are reflected back from an end of the cable and are radiated by the passive wireless antenna, such that the time delay corresponds to an amount of time taken by the series of RF signals to travel in the cable.

14. An apparatus for monitoring a condition of a structure, comprising:

a transmitter for transmitting a series of radio frequency (RF) signals with sweeping frequencies around a known resonant frequency to a passive wireless antenna sensor, wherein the passive wireless antenna sensor has the known resonant frequency when mounted on the structure and comprises an antenna comprising a dielectric substrate disposed between an antenna pattern and a ground plane such that a change in the condition of the structure being monitored will directly cause a change in at least one characteristic of the antenna, including a crack in the ground plane;

a receiver for receiving a backscattered signal from the passive wireless antenna sensor mounted on the structure, wherein the backscattered signal comprises an antenna backscattered signal and a structure backscattered signal, and the antenna backscattered signal is delayed with respect to the structure backscattered signal, such that the structure backscattered signal is received before the antenna backscattered signal; and a digital signal processor that is configured to, using the antenna backscattered signal received from the passive wireless antenna sensor, determine a resonant frequency of the passive wireless antenna sensor based on the antenna backscattered signal and determine the condition of the structure by comparing the determined resonant frequency of the passive wireless antenna sensor to the known resonant frequency of the passive wireless antenna sensor, whereby a change in the resonant frequency of the passive wireless antenna sensor indicates a change in the condition of the structure, including a detected crack in the structure.

15. The apparatus as recited in claim 14, wherein digital signal processor determines the resonant frequency of the passive wireless antenna sensor by:

converting the received backscattered signal to a time-domain signal using an Inverse Fast Fourier Transformation;

normalizing the time-domain signal;

creating a spectrogram for the normalized time-domain signal using a Short Time Fast Fourier Transformation;

determining a time at which the antenna backscattered signal occurs using the spectrogram;

time gating the normalized time-domain signal using a Hanning window and the determined time at which the antenna backscattered signal occurred; and determining the resonant frequency of the passive wireless sensor from the time gated Hanning windowed signal using a Fast Fourier Transformation.

16. The apparatus of claim 14, wherein the digital signal processor is further configured to save the determined resonant frequency in a data storage device, save the change in the resonant frequency in the data storage device, retrieve the known resonant frequency from the data storage device, and notify a user of the change in the condition of the structure.

17. The apparatus of claim 14 wherein the known resonant frequency comprises:

an original resonant frequency of the passive wireless antenna sensor when the passive wireless antenna sensor was mounted on the structure; or at least one previously determined resonant frequency of the passive wireless antenna sensor.

18. The apparatus of claim 14, wherein:

the characteristic of the passive wireless antenna sensor further comprises at least one of: (a) a dimension of the passive wireless antenna sensor, (b) a dielectric property of the passive wireless antenna sensor, and (c) a surface roughness of the antenna pattern;

the change in the resonant frequency comprises at least one of a frequency shift, a return loss, and a combination thereof; and the change in the condition of the structure further comprises at least one of a strain on the structure along a length direction of the antenna, a temperature change of the structure, a change in a known crack in the structure, a fatigue of the structure, and a combination thereof.

19. The apparatus of claim 14, wherein:

wherein the ground plane comprises a metallic or semi-metallic surface of the structure on which the passive wireless antenna sensor is mounted;

the passive wireless antenna sensor comprises a loop antenna, a patch antenna or a microstrip antenna;

the transmitter and the receiver are included in an antenna reader connected to a RF source and a frequency detector; and the structure comprises a metallic material, a non-metallic material, a composite material, a concrete material or a living tissue.

20. The apparatus of claim 19, wherein:

the antenna reader comprises a horn antenna, a patch antenna, a loop antenna or a lens antenna;

the antenna reader further comprises a transceiver connected to a circulator, or a transmitter and a receiver;

the RF source comprises a sweeping frequency synthesizer, as scanning RF source, a broadband RF source, or a vector spectrum analyzer; or the frequency detector comprises: (a) a bandpass filter connected to a low noise amplifier connected to a RF power detector, (b) a bandpass filter connected to a low noise amplifier connected to a mixer connected to a low-pass filter connected to an amplifier connected to a frequency demodulator, (c) a low noise amplifier connected to a RF power detector; or (d) a vector network analyzer.

21. The apparatus of claim 14, wherein the passive wireless antenna sensor comprises an array or network of individually addressable passive wireless antenna sensors and frequency division is used to multiplex the signals to the passive wireless antenna sensors.

22. The apparatus of claim 14, wherein at least two passive wireless antenna sensors are used and each passive wireless antenna sensor has a different known resonant frequency.

23. The apparatus of claim 14, wherein the passive wireless antenna sensor is tunable.

24. The apparatus of claim 14, wherein the passive wireless antenna further comprises:

a crack fabricated in the ground plane; and a mechanical actuator attached to the ground plane to open or close the fabricated crack.

25. The apparatus of claim 14, wherein the time delay is introduced in the antenna backscattered signal by a cable connected to the passive wireless antenna sensor.

* * * * *